(No Model.)

E. F. BARTON.
CRATE.

No. 332,376. Patented Dec. 15, 1885.

Attest
Geo. F. Robinson
2 Cook

Inventor
Edward F. Barton
By Bradford Howland
Attorney.

UNITED STATES PATENT OFFICE.

EDWARD F. BARTON, OF RAVENNA, OHIO, ASSIGNOR OF ONE HALF TO THEODORE GRUNDEL, OF SAME PLACE.

CRATE.

SPECIFICATION forming part of Letters Patent No. 332,376, dated December 15, 1885.

Application filed July 15, 1885. Serial No. 171,677. (No model.)

*To all whom it may concern:*

Be it known that I, EDWARD F. BARTON, of Ravenna, Portage county, Ohio, have invented a new and useful Improvement in Crates, of which the following is a specification.

My invention consists of a crate in eight adjustable parts or sections, and adapted as a package for cigar-boxes and other articles.

The object of my invention is to obviate the expense of making a new crate for every different-sized package. This I accomplish by making the crate so that it can be enlarged and contracted in all or any of its dimensions.

Figure 1:
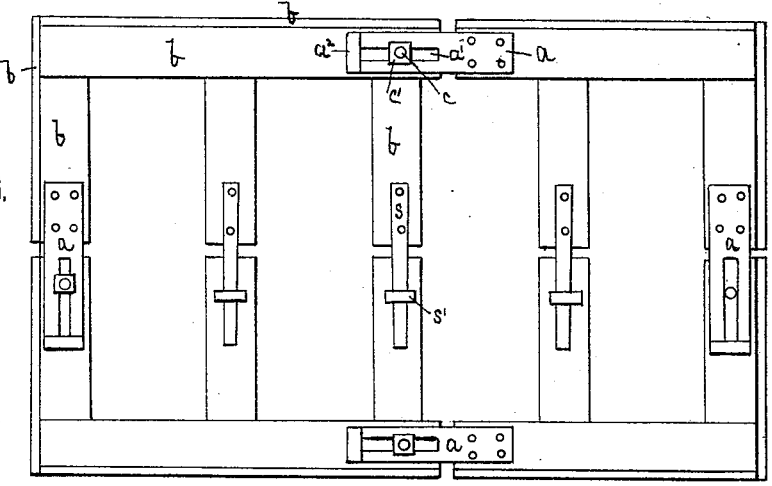
Figure 2:
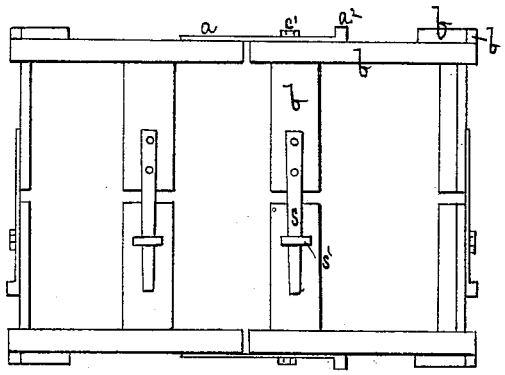
Figure 4:
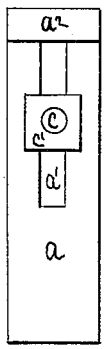
Figures 5, 6:
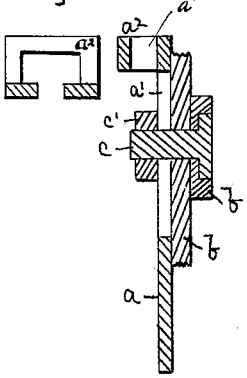
Figure 3:
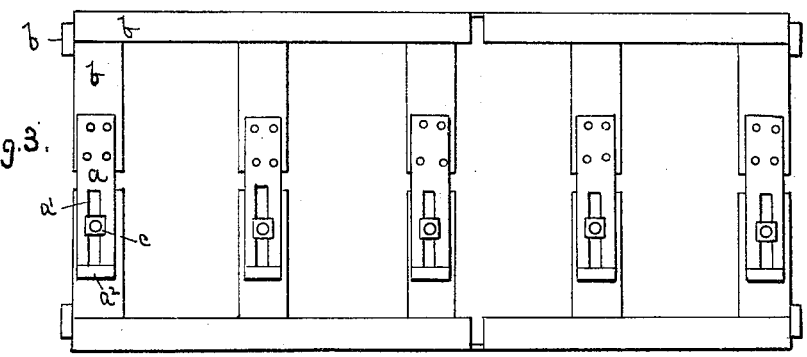

In the drawings forming a part of this specification, Figure 1 is a plan of the crate. Fig. 2 is an end view of the same. Fig. 3 is a side view of the same. The other three figures are on an enlarged scale and represent the adjustable clamp, Fig. 4 being a face view, Fig. 5 a cross-section, and Fig. 6 a longitudinal section, of the same.

The crate is of the usual skeleton form, but composed of eight sections or parts, each of which forms a corner of the crate. Each section is formed of boards or slats $b$ fastened together. The crate may first be made in the usual way—that is, with slats $b$ of the length of each dimension of the crate, and then it may be sawed into the eight sections. The sections are adjustably held together by means of clamps composed of the slotted plate or bar $a$ and screw-bolt and nut $c$ $c'$. One end of bar $a$ is fastened to slat $b$ at or near its end, and the other end of the bar extends over the opposite slat $b$ on another section of the crate. Bar $a$ is formed with slot $a'$ to receive bolt $c$, and a raised part or lug, $a^2$, to prevent the sides of bar $a$ from spreading apart, and having an opening, $a^3$, to allow nut $c'$ to pass under the top of the lug. It is not necessary that all the slats should be connected by the clamps, but instead bars $s$ and staples $s'$ may be used on some of them, as shown in Fig. 2, with one end of the bar to slide in the staple. After loosening nuts $c'$ the dimensions of the crate may easily be adjusted, and any of the sections may be taken entirely away from the others without removing either nuts $c'$ or bolts $c$, as the nut on the bolt will slide out of slot $a'$ under lug $a^2$.

I claim as my invention—

1. A crate formed in sections, each including a corner of the crate, the sections being adjustably connected by means of clamps, substantially as described.

2. A crate composed of sections provided with bars $a$, formed with slots $a'$ and lugs $a^2$, and bolts $c$ and nuts $c'$, substantially as described.

3. A crate in sections, each including a corner of the crate, and provided with bars $s$, staples $s'$, and clamps to hold the sections together, substantially as described.

EDWARD F. BARTON.

Witnesses:
 BRADFORD HOWLAND,
 GEO. F. ROBINSON.